Figure 1:
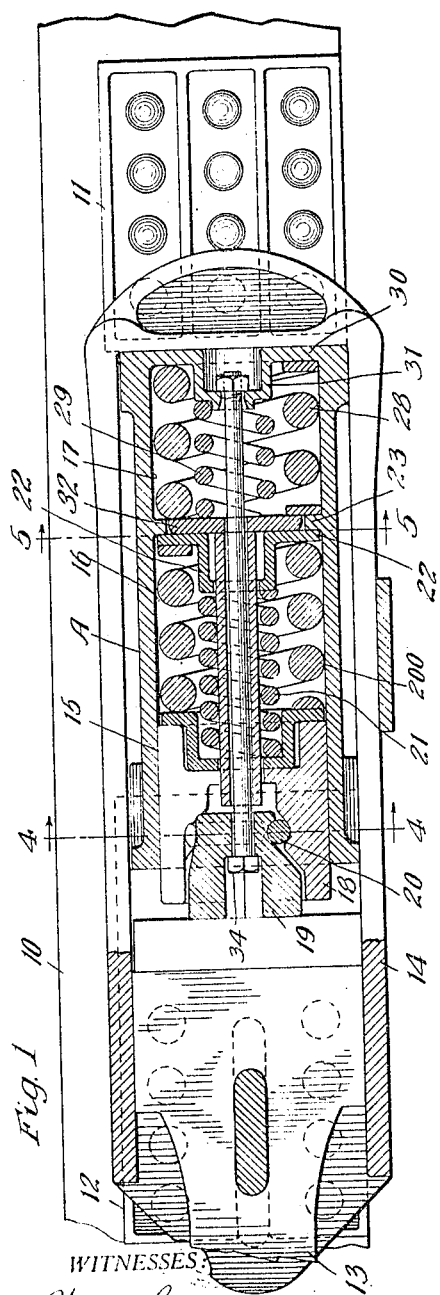

J. F. O'CONNOR.
FRICTION GEAR FOR RAILWAY DRAFT RIGGING.
APPLICATION FILED JUNE 10, 1915.

1,292,861.

Patented Jan. 28, 1919.
2 SHEETS—SHEET 1.

WITNESSES:

INVENTOR.
John F. O'Connor
BY
ATTORNEY

J. F. O'CONNOR.
FRICTION GEAR FOR RAILWAY DRAFT RIGGING.
APPLICATION FILED JUNE 10, 1915.
1,292,861.
Patented Jan. 28, 1919.
2 SHEETS—SHEET 2.
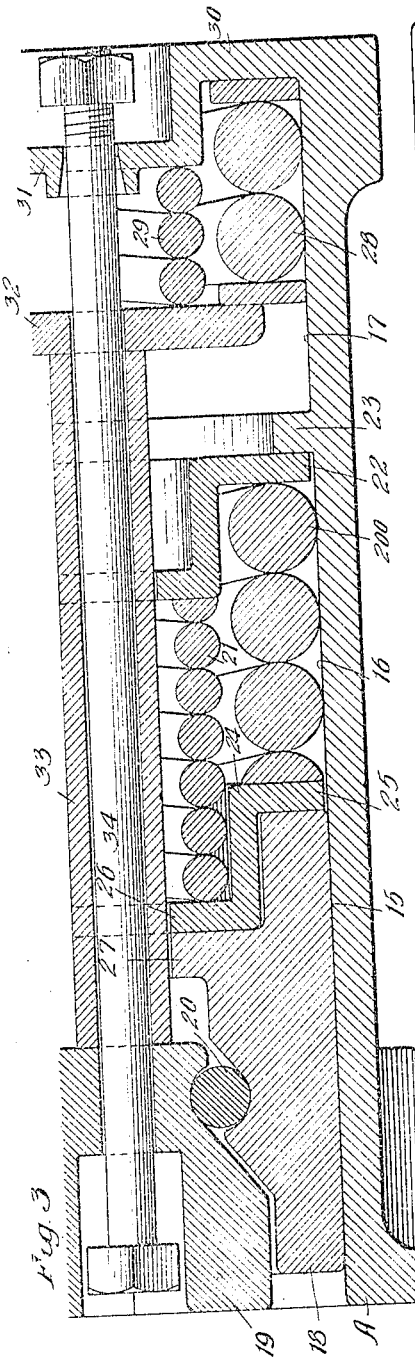
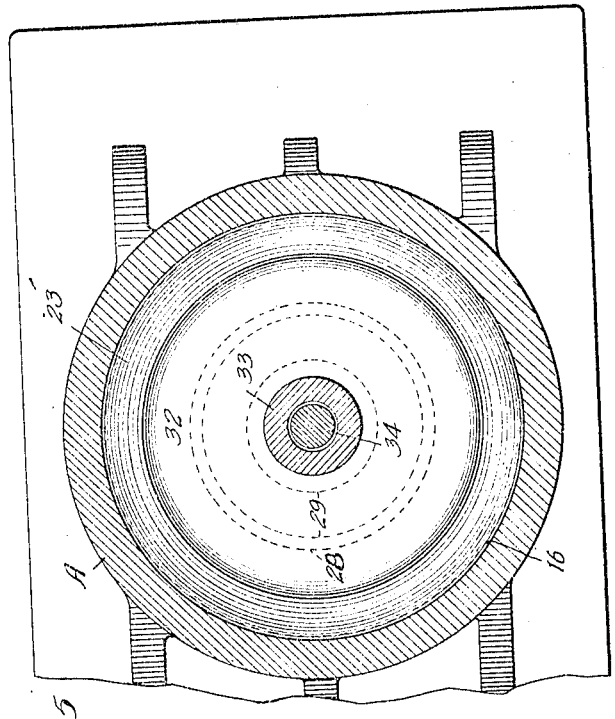
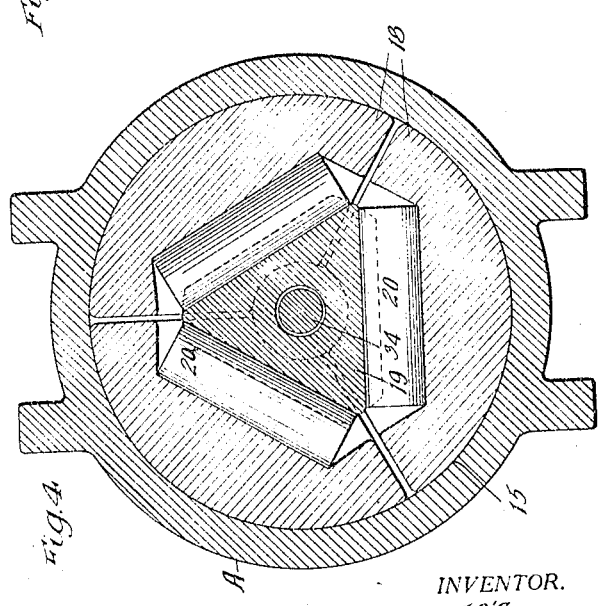
WITNESSES:
INVENTOR.
John F. O'Connor
BY
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION-GEAR FOR RAILWAY DRAFT-RIGGING.

1,292,861. Specification of Letters Patent. Patented Jan. 28, 1919.

Application filed June 10, 1915. Serial No. 33,276.

*To all whom it may concern:*

Be it known that I, JOHN F. O'CONNOR, a citizen of the United States, residing at Chicago, in the county of Cook and State of Illinois, have invented a certain new and useful Improvement in Friction-Gears for Railway Draft-Rigging, of which the following is a full, clear, concise, and exact description, reference being had to the accompanying drawings, forming a part of this specification.

This invention relates to improvements in friction gears for railway draft rigging.

In the operation of railway draft riggings of the friction type, it has heretofore been found that while the gears may be developed to absorb the heavy shocks imposed upon them, under certain conditions the gears may not readily release; for instance, when a heavy train is being drawn up a grade and after a heavy shock has been imposed upon the gears and the tractive effort does not decrease beyond a certain point, if the gears have been compressed to their full capacity, the continuance of the heavy tractive effort may be sufficient to prevent the gear from fully releasing, since the releasing action or expanding action of the springs is not sufficient to move the elements of the gear to fully released position against the constant pull exerted by the locomotive. The result of this is, that subsequent additional shocks intended to be absorbed by the gears are transmitted to the gear which is substantially solid. Briefly explained, this action may be stated as follows: Upon the initial heavy blow, the shock is absorbed by the friction gear in a graduated manner until the maximum capacity of the gear is reached. This maximum capacity is reached by a movement of the friction elements of three to four inches. In the release of the gear after the maximum capacity has been reached, the capacity drops from the maximum to a relatively very small amount, say thirty or forty thousand pounds, while the friction elements move in the release direction only a very slight proportion of their total possible movement; that is, the capacity of the gear during the release action will drop from the maximum to say thirty or forty thousand pounds while the friction elements return in the release direction a distance of only a few hundredths of an inch, which distance is so small that it may be practically neglected. If, therefore, at this stage, after the capacity has dropped to say thirty or forty thousand pounds, and the friction elements have remained practically in their fully closed position, the tractive effort or pull on the gear is over the thirty or forty thousand pounds, which is not at all unusual when long trains are being hauled up grades, the tendency of the gear to release is less than the force of the tractive effort to hold all the parts in their same relative position. Consequently, when another heavy shock is encountered, it must be absorbed by the gear with a movement of the friction elements equal to said few hundredths of an inch, which practically means that the shock is absorbed by a solid gear. As will be apparent to those skilled in the art, this condition causes excessive wear and damage to the draft rigging and car and is extremely undesirable.

The object of my invention is to provide a friction gear for draft riggings which is free from any of the possible defects of operation above indicated and in which a certain and full release of the friction elements will always occur under any operating conditions.

Another object of the invention is to provide a friction gear having a greater shock absorbing capacity than those heretofore employed and using a similar arrangement of friction elements proper.

The invention furthermore consists in the improvements of the parts and devices, and in the novel combinations of the parts and devices as herein shown, described and claimed.

Figure 2:
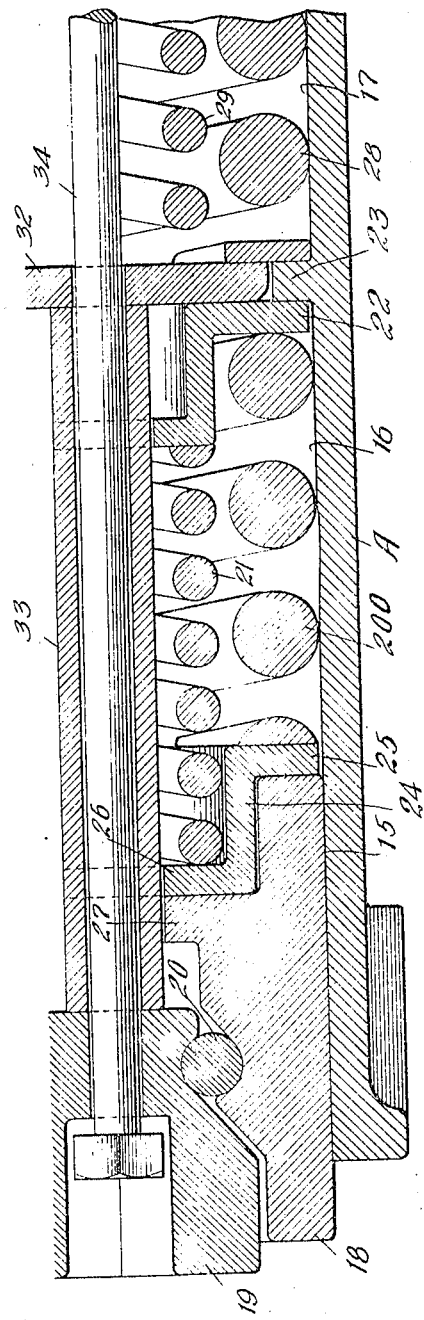

In the drawing forming a part of this specification, Figure 1 is a longitudinal vertical sectional view of a draft rigging showing my improvements in connection therewith, the parts being in normal or fully released position. Fig. 2 is an enlarged longitudinal sectional view of a portion of the gear proper, showing the position of the parts after a slight initial movement. Fig. 3 is a view similar to Fig. 2, but showing the parts under full compression. Figs. 4 and 5 are transverse sectional views taken on the lines 4—4 and 5—5 of Fig. 1.

In said drawing, 10 denotes the center or draft sill to which are attached the rear and front stops 11 and 12. The draw bar 13 is operatively connected with the gear proper by a hooded cast yoke 14. The foregoing parts are, or may be, of any well-known or desired construction.

The friction gear proper, as shown, comprises a combined friction shell and spring casing designated generally by the reference A; said member A has a friction shell or cylinder proper 15, a front spring chamber 16, and a rear spring chamber 17. Coöperable with the friction shell is a plurality of friction shoes 18, and a wedge or spreader 19, a plurality of anti-friction rolls 20 being interposed between the wedge or spreader and the friction shoes. Movement of the friction shoes is resisted by a main spring consisting of an outer coil 200 and a nested inner coil 21, the coils of said main spring having their rear or inner ends bearing upon a detachable or removable follower or partition 22 which is held in fixed relation relatively to the member A by an internal annular shoulder 23, which separates the front spring chamber from the rear spring chamber. The front ends of the inner and outer coils of said main spring bear against a cup-shaped follower or washer 24 having an annular flange 25 engaging the inner ends of the shoes and the dished portion 26 thereof engages shoulders 27 on the inner sides of the shoes. As will be apparent, upon actuation of the gear, movement of the wedge will be resisted by said main spring through the intermediary of the friction shoes in a well-known manner, and the release will occur in the usual manner. In the rear spring chamber 17 is provided a second main spring comprised of an outer coil 28 and a nested inner coil 29, said coils bearing at their rear ends against the rear wall 30 and boss 31 of the member A. The front ends of said coils 28 and 29 bear against a movable spring follower 32, which in normal position, is located within the recess formed by the annular rib 23. Each of the followers 22 and 24 is centrally recessed and extending through said recesses is an elongated hollow plunger 33 which extends from the follower 32 to a point slightly spaced from the inner end of the wedge or spreader 19 (see Fig. 1). Extending through the plunger 33, follower 32, boss 31 and wedge 19, is a connecting rod or bolt 34, adapted to hold the parts in assembled position and also to maintain the springs under an initial compression.

In operation the resistance to the movement of the shoes and wedge by the main spring in the chamber 16 is as heretofore described. In addition to the foregoing, the wedge or spreader is resisted by the capacity of the rear main spring directly through the follower 32 and plunger 33, the clearance between the front end of the latter and the wedge being provided to give an easy initial action. In other words, the shock absorbing capacity of the gear is equal to the sum of the combined spring and friction action of the front spring, shoes and wedge and the spring capacity of the rear main spring. Upon release, the rear main spring will act directly upon the wedge by means of the plunger 33 (see Fig. 3) and force the latter outwardly and this releasing action is effected by a main spring of heavy capacity. This outward movement of the wedge will in turn release the friction shoes and thereafter the expanding capacity of the rear main spring will augment that of the rear main spring in effecting the movement of all the friction elements to a fully released position. By this arrangement, I obtain a releasing capacity of several times that obtained in the friction gears now on the market. Furthermore, on account of this increased releasing capacity of the gear, I am enabled to use a blunter angle on the wedge and thus thereby increase the frictional shock absorbing capacity.

Although I have herein shown and described in detail one embodiment of my invention, yet I am aware that numerous changes and modifications may be made in the details of construction and arrangements of parts without departing from the spirit of the invention. I am also aware that the improvement may be embodied in many types of friction gears other than that herein shown and described. Furthermore, I wish it distinctly understood that when I employ the term "spring" I use the same in the broad sense and contemplate not merely a single coil, but any number of coils, nested or otherwise arranged, and wherein the function is that of a single spring. I also use the term "friction shoes" and "wedge" or "spreader" in the broad sense, and contemplate not merely the specific structures herein shown and described, but all other arrangements performing a similar or equivalent function.

I claim:

1. A friction gear for draft riggings which comprises, a friction shell, friction shoes and wedge coöperable therewith, a main spring resisting movement of said shoes, a second main spring in alinement with the first named main spring, and means extending through the first named main spring interposed between the second named main spring and said wedge to thereby provide additional resistance to the movement of the wedge in absorbing shocks and to cause said last named spring to act directly on the wedge in release and independently of the release movement of said shoes.

2. In a friction gear, the combination with a combined friction shell and spring casing having two spring chambers, friction shoes and wedge coöperable with said shell, and a spring in one of said chambers coöperating directly with said shoes, of a second spring in the other spring chamber, and means interposed between said spring and the wedge whereby movement of the wedge is resisted indirectly by one spring through the shoes and directly by the other spring.

3. In a friction gear, the combination with a combined friction shell and spring casing having two spring chambers arranged in tandem and separated by shoulders on the interior thereof, friction shoes and wedge coöperable with said shell, and a spring within the front one of said chambers and arranged to resist movement of said shoes, the rear end of said spring being prevented from movement relatively to said shell by said shoulders, of a main spring located in the rear spring chamber and having its rear end bearing against the rear wall of said shell and casing, a follower bearing against the front end of said rear spring, and a plunger interposed between said follower and said wedge.

4. In a friction gear, the combination with a combined friction shell and spring casing having a friction cylinder and two spring chambers separated by an internal annular shoulder, a main spring in the rear spring chamber and follower at the front end of said spring, a spring within the front spring chamber and held from rearward movement relatively to said cylinder by said shoulder, a plurality of friction shoes, a wedge coöperable with said shoes, anti-friction rollers interposed between said wedge and shoes, of a plunger extending from said follower through the front spring chamber to a point adjacent the inner end of said wedge.

5. In a friction shock absorbing mechanism, the combination with a friction shell and spring casing, of a plurality of friction elements coöperable with said shell, said elements including a spreader, a pair of springs within the casing, one of said springs being adapted to resist movement of all of the friction elements during the entire compressive stroke, and a column acting member interposed between the second spring and said spreader whereby the spreader is adapted to be directly resisted by said second spring, the column acting member being of slightly lesser length than the distance between said spreader and the second spring, whereby a preliminary movement of the friction elements is obtained without actuation of said second spring.

6. A friction shock absorbing mechanism for railway draft riggings and the like, said mechanism including a combined friction shell and spring casing, a series of friction shoes coöperable with the shell, a spreader located centrally of the shoes and co-acting therewith, a spring for directly resisting movement of said shoes relatively to the shell and mounted within said casing, a second spring located in alinement with the first named spring at a greater distance from the friction shoes, and means interposed between the spreader and the second named spring whereby the latter is adapted to directly resist movement of the spreader and effect its release.

In witness that I claim the foregoing I have hereunto subscribed my name this 1st day of June 1915.

JOHN F. O'CONNOR.